Feb. 16, 1926. 1,573,008
D. MacLEAN
TROLLEY WHEEL
Filed April 17, 1923 2 Sheets-Sheet 1
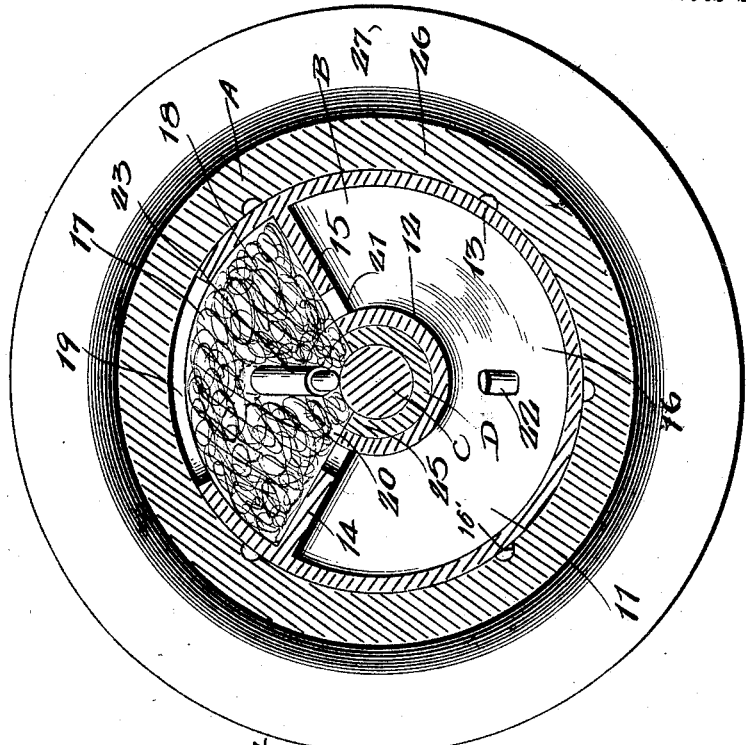
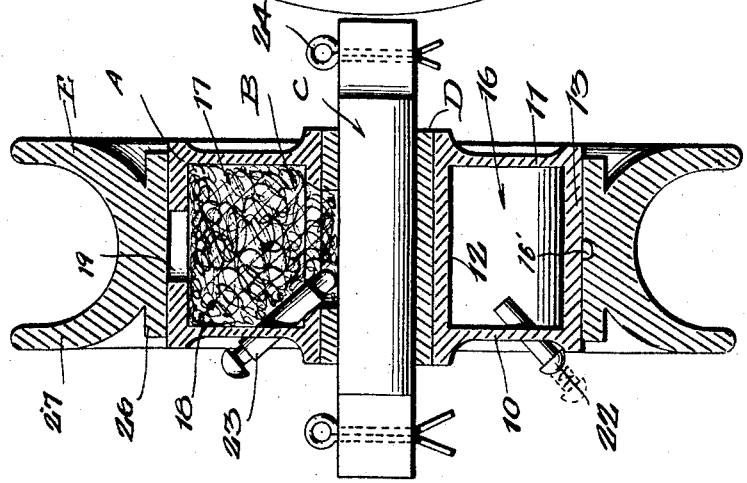
WITNESSES
Inventor
DONALD MacLEAN,
By Richard B. Owen,
Attorney Feb. 16, 1926.
D. MacLEAN
1,573,008
TROLLEY WHEEL
Filed April 17, 1923　　2 Sheets-Sheet 2
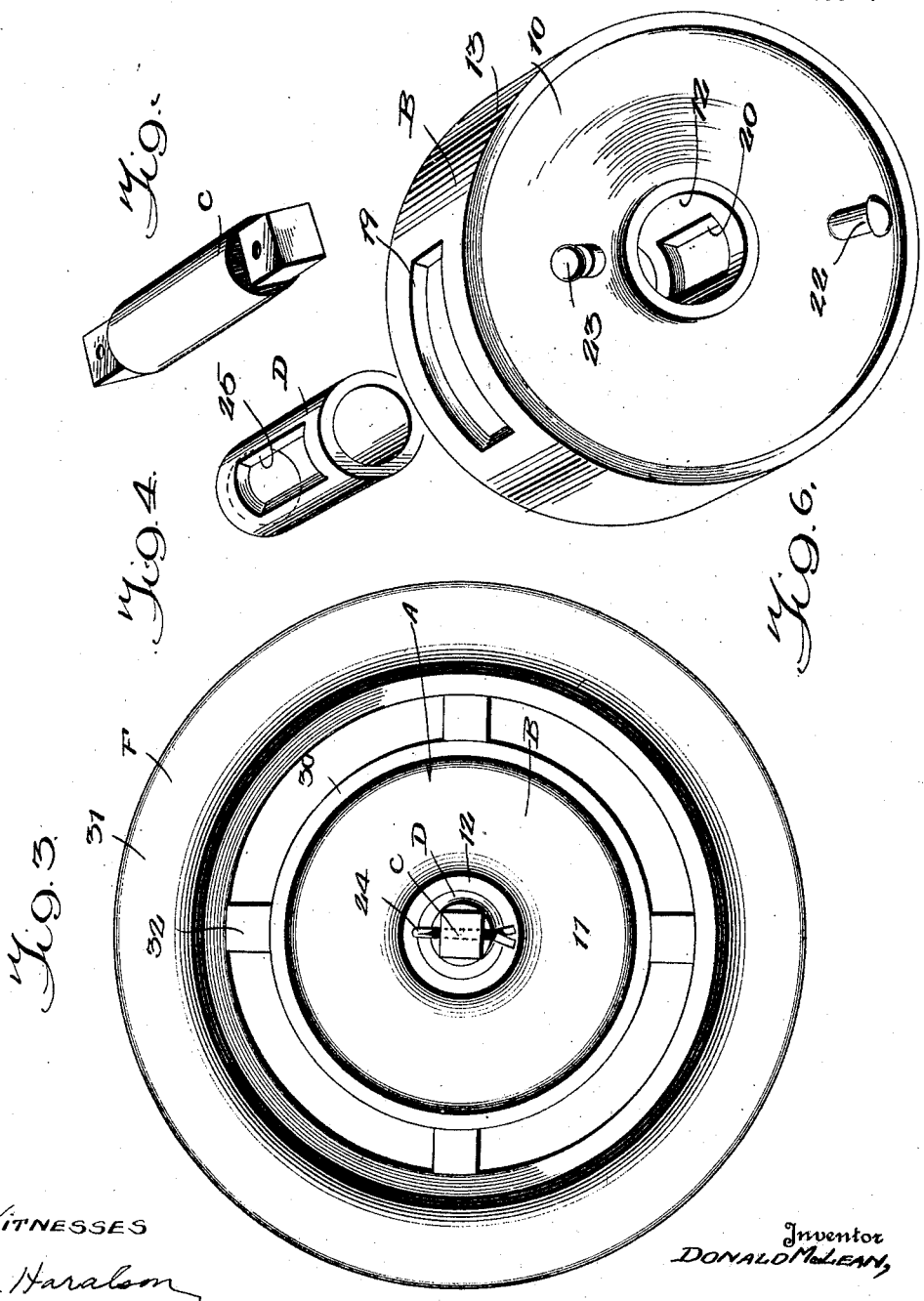

Patented Feb. 16, 1926.

1,573,008

UNITED STATES PATENT OFFICE.

DONALD MacLEAN, OF NORTH VANCOUVER, BRITISH COLUMBIA, CANADA.

TROLLEY WHEEL.

Application filed April 17, 1923. Serial No. 632,728.

*To all whom it may concern:*

Be it known that I, DONALD MACLEAN, a subject of the King of Great Britain, residing at North Vancouver, in the Province of British Columbia and Dominion of Canada, have invented certain new and useful Improvements in a Trolley Wheel, of which the following is a specification.

This invention relates to trolley wheels and the primary object of the present invention is to provide an improved trolley wheel having novel means for lubricating the bearing and supporting shaft whereby the shaft and bearing is thoroughly oiled at all times, eliminating the necessity of oiling the same by hand at different intervals and insuring the proper wear of the bearing and shaft.

Another object of the invention is the provision of a trolley wheel embodying a novel hub having a relatively large oil cup or chamber formed directly therein with ways communicating with a waste or feed chamber, which engages the bearing and shaft, thereby effectively lubricating said bearing and shaft.

A further object of the invention is to provide a detachable rim for said novel hub, whereby when the rim becomes worn or mutilated, the same can be removed and a new rim substituted therefor and placed upon the hub, thereby reducing the cost of the use of trolley wheels and eliminating the necessity of throwing the entire trolley wheel away when the rim thereof becomes mutilated.

With these and other objects in view, the invention consists in the novel construction, arrangement and formation of parts, as will be hereinafter more specifically described, claimed and illustrated in the accompanying drawings, in which drawings:

Figure 1 is a diametric section through the trolley wheel constructed in accordance with this invention.

Figure 2 is a central circumferential section through the improved trolley wheel taken on the line 2—2 of Figure 1.

Figure 3 is a side elevation of the improved trolley wheel showing a different type of rim connected therewith, for making the wheel a larger size.

Figure 4 is a detail perspective view of the bearing for the supporting shaft.

Figure 5 is a perspective view of the shaft.

Figure 6 is an enlarged detail perspective view of the novel hub for the wheel.

Referring to the drawings in detail, wherein similar reference characters designate corresponding parts throughout the several views, the letter A generally indicates the improved trolley wheel which embodies the novel hub B, the supporting shaft C, the bearing D and the rim E.

It is to be understood at this point that other types of rims can be used on the hub so that different sized wheels may be had, and in Figure 3 is shown a modified form of rim F for making a wheel of a larger diameter. This type of rims will be of course hereinafter more fully described.

The hub B comprises a hollow circular body including the side disk-shaped walls 10 and 11, the axially disposed hub sleeve 12 for receiving the bearing D and the outer annular felly plate 13.

The hollow body of the hub B is provided by radially extending partition walls 14 and 15, which extend from the hub sleeve 12 to the felly wall 13 into a relatively large oil receiving chamber or cup 16 and the oil feed chamber 17 in which is adapted to pack suitable waste or the like 18.

The felly plate or wall 13 has formed therein a relatively large opening 19 which communicates with the waste chamber 17 which permits the filling of the chamber, with waste 18. The hub sleeve 12 is also provided with an opening 20 through which the waste 18 is adapted to extend, for a purpose, which will be hereinafter more fully described. Partition walls 14 and 15 are provided with openings 21 which connect the chamber 16 with the chamber 17, whereby the oil can flow into the chamber 17 for saturating the waste 18. An oil filling plug or screw 22 is carried by the side wall 10 for facilitating the filling of the chamber or oil cup 16 with oil. A screw or oil filling plug 23 is also carried by the side wall 10 and extends into the chamber 17 through the opening 21 and can also be used for forcing the waste in the chamber 17 through said opening for insuring engagement thereof with the shaft D. If desired the waste can also be forced through said opening by suitable hooks or the like.

The supporting shaft E is of course the ordinary construction and can have its terminals made polygonal shaped and apertured for the receipt of cotter keys or pins 24. The bearing D can be made of Babbitt metal, brass or the like and is placed between the shaft C and the sleeve 12 and is also provided with a longitudinally extending opening 25 which registers with the opening 21 and permits the waste to extend therethrough for engagement with the shaft and thereby effectively lubricate the same.

The rim E includes the annular rim plate 26 for fitting on the felly plate or wall 13 and is secured thereto in any preferred way. This rim plate 26 carries the ordinary type of annular channeled guide 27 for the trolley wire (not shown).

The rim F is of course of a larger type than the rim E and embodies the rim plate 30 for engaging the felly plate or wall 13, the spaced trolley wire guide 31 and the spokes 32 which can be of different lengths so as to form different diameters of rims.

The inner surfaces of the rims E and F are preferably provided with a plurality of indentations or notches 16', which will serve as means to indicate when the rim is worn out. It is obvious that when the rim is worn down to the said indentations or pockets that it is time to place a new rim upon the wheel.

From the foregoing description it can be seen that an improved trolley wheel has been provided of exceptionally simple and durable character, which will permit mutilated rims to be removed from the hub so that new rims can be substituted therefor and which embodies novel means for lubricating the supporting shaft of the wheel.

Changes in details may be made without departing from the spirit or the scope of this invention.

What I claim as new is:

A trolley wheel comprising a hollow sleeve, an annular felly, and side plates connecting the hub sleeve and felly together, radially extending partitions connecting the felly, the hub sleeve and end plates together forming a relatively large and a relatively small compartment, the relatively large compartment constituting an oil reservoir, the relatively small compartment constituting a receptacle for the reception of an absorbent, means introducing the absorbent into the first mentioned compartment, the hub sleeve having an opening therein, means for pushing the absorbent through said opening, means for introducing a lubricant into the oil reservoir, and means connecting the compartments together.

In testimony whereof I affix my signature.

DONALD MacLEAN.